United States Patent
Muhl et al.

(10) Patent No.: US 7,764,505 B2
(45) Date of Patent: Jul. 27, 2010

(54) THERMALLY STABLE AND LIQUID-TIGHT JOINT BETWEEN A FIRST CERAMIC, METAL, OR PLASTIC COMPONENT AND A SECOND CERAMIC, METAL OR PLASTIC COMPONENT, AND THE USE OF ONE SUCH JOINT

(75) Inventors: Mike Muhl, Freiburg (DE); Andreas Derr, Wutöschingen (DE); Gerd Heckelmann, Lenzkirch (DE); Heinz Oswald, Bonndorf (DE); Jürgen Hall, Rötenbach (DE)

(73) Assignee: Testo AG, Lenzkirch (DE)

( * ) Notice: Subject to any disclaimer, the term of this patent is extended or adjusted under 35 U.S.C. 154(b) by 1213 days.

(21) Appl. No.: 10/539,786

(22) PCT Filed: Dec. 17, 2003

(86) PCT No.: PCT/EP03/14425

§ 371 (c)(1),
(2), (4) Date: Jan. 11, 2006

(87) PCT Pub. No.: WO2004/056719

PCT Pub. Date: Jul. 8, 2004

(65) Prior Publication Data

US 2006/0257636 A1    Nov. 16, 2006

(30) Foreign Application Priority Data

Dec. 19, 2002 (DE) .................................. 102 59 746

(51) Int. Cl.
*H05K 7/00* (2006.01)

(52) U.S. Cl. ....................................... 361/728; 361/805

(58) Field of Classification Search ................. 361/760, 361/741, 736, 807, 810, 803–805
See application file for complete search history.

(56) References Cited

U.S. PATENT DOCUMENTS 4,019,080 A    4/1977    Besson (Continued)

FOREIGN PATENT DOCUMENTS

DE    1 269 024    5/1968

(Continued)

OTHER PUBLICATIONS

"Modulus of elasticity", Aus Hpm-wiki, <<http://www.hpmcornet.eu/mediawiki/index.php?title=Modulus_of_elasticity>>, Apr. 28, 2008, 4 pages (English Translation 4 Pages).

*Primary Examiner*—Hung S Bui
(74) *Attorney, Agent, or Firm*—Muirhead and Saturnelli, LLC

(57) ABSTRACT

The invention relates to a joint which can be subjected to the temperature influences of an external medium (20) and joins an especially ceramic component (2) to an especially metallic component (1). Said joint consists of a first adhesive joint (14) between the metallic component and the ceramic component, and a second adhesive joint (22), the adhesive (16) of the second joint having a higher elasticity than that (10) of the first adhesive joint (14), and the second joint being arranged in such a way that it prevents direct contact between the first adhesive joint (14) and an external medium (20). The inventive joint can preferably be used, for example, preferably in a sensor module of a measuring appliance which can be introduced into a medium to be analyzed.

20 Claims, 1 Drawing Sheet

U.S. PATENT DOCUMENTS

| | | |
|---|---|---|
| 4,315,974 A | 2/1982 | Athearn et al. |
| 4,955,522 A | 9/1990 | Stuhler |
| 4,984,927 A * | 1/1991 | Kojima et al. ............... 403/30 |
| 5,046,242 A | 9/1991 | Kuzma |
| 5,095,246 A | 3/1992 | Feuersanger et al. |
| 5,618,462 A | 4/1997 | Swars |
| 5,738,270 A | 4/1998 | Malmgren |
| 6,410,081 B1 | 6/2002 | De La Prieta |
| 6,431,781 B1 | 8/2002 | Schenk |
| 6,436,545 B1 | 8/2002 | Tanahashi et al. |
| 6,533,161 B1 | 3/2003 | Gessner |
| 6,621,160 B2 * | 9/2003 | Shibamoto et al. .......... 257/712 |
| 6,794,614 B2 * | 9/2004 | Taniguchi et al. ........... 219/270 |
| 7,523,006 B2 | 4/2009 | Muhl et al. |
| 2002/0139563 A1 | 10/2002 | Fujii et al. |

FOREIGN PATENT DOCUMENTS

| | | |
|---|---|---|
| DE | 43 03 581 A1 | 8/1994 |
| DE | 198 42 276 A1 | 3/2000 |
| DE | 102 02 002 A1 | 8/2003 |
| EP | 0 660 449 A2 | 6/1995 |
| EP | 1 239 701 A2 | 9/2002 |
| FR | 2 559 477 | 8/1985 |
| FR | 2 643 088 | 8/1990 |
| GB | 2 086 288 A | 5/1982 |
| WO | WO94/18442 | 8/1994 |
| WO | WO95/00459 | 1/1995 |
| WO | WO02/062519 A1 | 8/2002 |

* cited by examiner

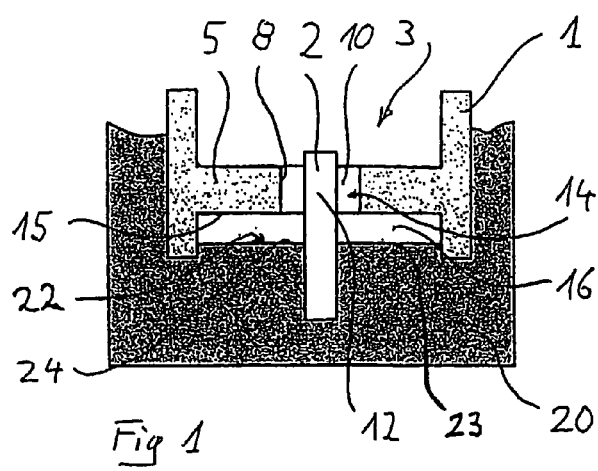
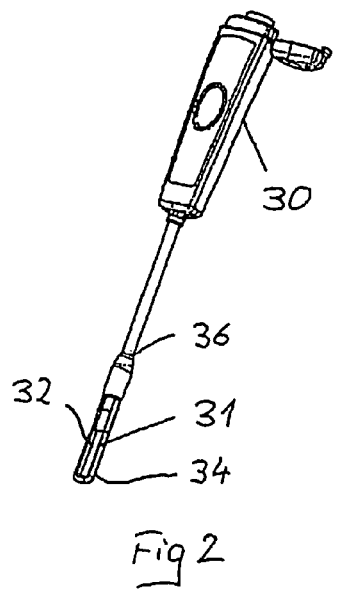
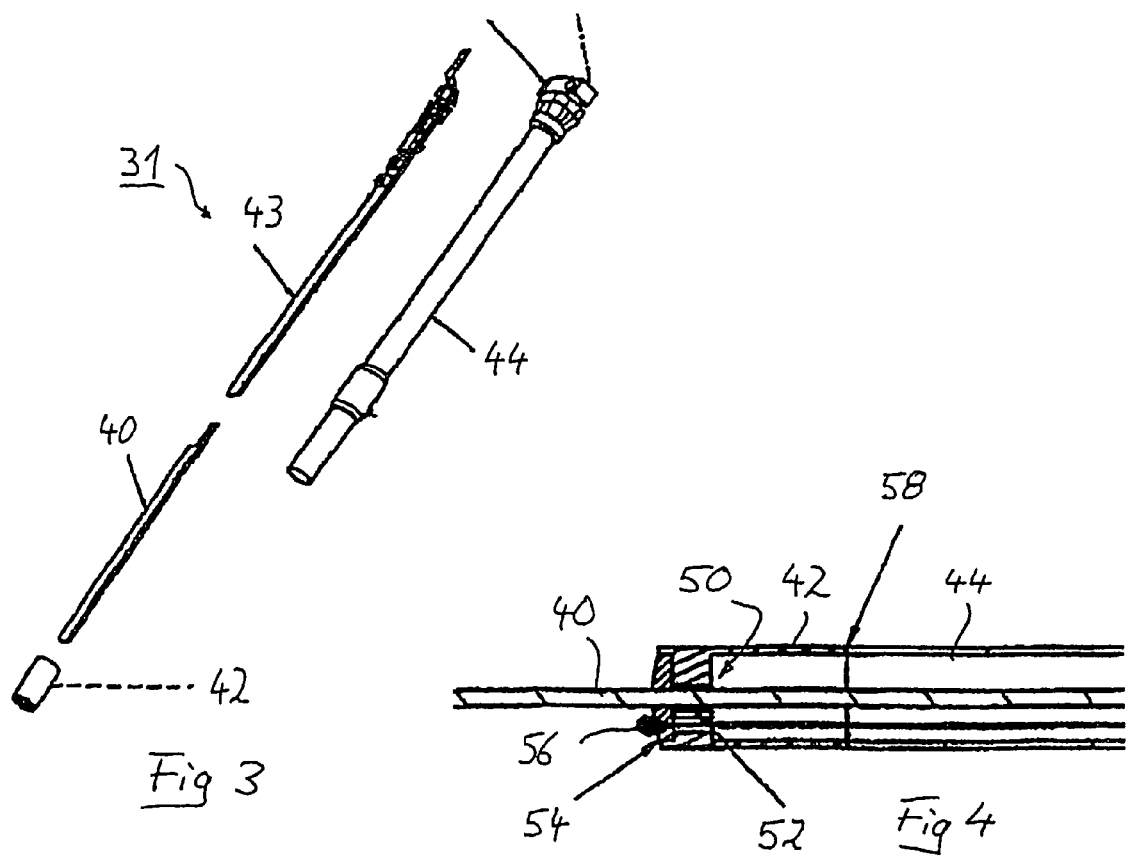
Fig 1
Fig 2
Fig 3
Fig 4

THERMALLY STABLE AND LIQUID-TIGHT JOINT BETWEEN A FIRST CERAMIC, METAL, OR PLASTIC COMPONENT AND A SECOND CERAMIC, METAL OR PLASTIC COMPONENT, AND THE USE OF ONE SUCH JOINT

FIELD OF INVENTION

The present invention relates to a thermostable and liquid-tight joint between a first component and a second component. Such joints are found, for example, in measuring or monitoring devices which are brought into direct contact with a medium to be measured or monitored. These devices frequently require joints, for example, between ceramic components such as sensors or circuit carriers and other, for example metallic structural elements, such as mounts.

BACKGROUND OF THE INVENTION

At sudden temperature changes ("temperature shocks"), e.g., during immersion of the measuring or monitoring device into the measuring medium, these joints are frequently exposed to extreme mechanical stresses due to the different temperature coefficients and the associated different expansion behavior of the (ceramic and metallic) materials involved. This may result in cracking of the joints, for example.

Therefore, high demands are placed on the joints in practice with regard to reliability, durability, long-term stability, and tightness. The long-term-stable tightness in particular is of substantial importance, since gases, liquids, or foreign particles, which undesirably intrude from the outside due to leakages (cracking), may result in damage or even destruction of the (measuring) device.

High-grade joints between ceramic and metallic components are generally known. US 2002/0139563 A1 describes a joint between a metallic connection and a ceramic substrate using a melted interim layer made of a foil containing indium. Manufacturing this joint is very expensive from the processing point of view.

DE 43 03 581 A1 describes an electrically insulating, gas-tight lead-through of at least one electrical conductor through a metallic casing of an exhaust system of an internal combustion engine. The lead-through is formed by two integral tabs, two consecutive sections being provided in the lead-through direction between them. In the first section, close to the exhaust system, the led-through metallic conductors are electrically insulated from the metallic tabs by a ceramic material, clay in particular. A permanently elastic plastic material is used in the subsequent second section as an electrical insulation and sealing material between the conductors and the tabs. DE 43 03 581 A1 thus addresses the problem of the gas-tight, electrically insulated lead-through of one or multiple electrical (metallic) conductors through a lead-through of an exhaust system formed by metallic tabs.

In contrast to the related art, the present invention provides a cost-effective and technically easy to manufacture, thermostable and liquid-tight joint between a first component, ceramic in particular, and a second component, metallic in particular, which may be exposed to an external medium and which reliably withstands rapid and frequent temperature changes ("temperature shocks").

SUMMARY OF THE INVENTION

According to one embodiment of the present invention, a joint has a first bond between the first and the second component and a second bond whose adhesive has a greater elasticity than the adhesive of the first bond and which is placed in such a way that direct contact of the first bond with the external medium is prevented.

Non-elastic adhesives, ceramic and epoxy resin adhesives in particular, are suitable as adhesives for the first bond, such as: EP21AOHT, EP21CHT-1, EP21TDCHT-1, EP34CA, EP35, EP39 MHT, EP42HT, EP121CL, . . . (Master-Bond Corporation); 7030, 903HP, 989, Durapot 801, Resbond S5H13, Duralco 4460, Duralco 4525, Duralco 4525 EHV, Duralco 4535, . . . (Cotronics Corporation); EP 5430 (Rhenatech Corporation); DER 354 (Dow Corning Corporation).

Elastic adhesives which are favorably food-compatible, silicone compounds in particular (resins and bonding agents), are suitable as adhesives for the second bond, e.g., Food-compatible adhesives:

RTV 102, 103, 106, 108, 109, 112, 116, 118, 159, 19.01, IS 800, 802, 803, 806, 808, SCS 1001-1003, 1009, 1097, 1297 (General Electric Corporation); Loctite Superflex (Loctite Corporation)

Other adhesives:

VT 3601 E, VU 4691, VU 4694 E, VU 4670 (Peters Corporation); Scrintec 901 (Roth Corporation); 5366, 5367, 5368, 5375, 5398, 5399 (Loctite Corporation).

A first aspect of the present invention is to provide the use of separately optimized adhesives or adhesives optimizable in their selection. The adhesive selected for the first bond may be selected in an optimized manner with regard to the strength of the mechanical joint (fixing) between the first and the second component. This means that a relatively hard, less elastic, strong adhesive having very good mechanical strength properties may be selected.

In contrast, an adhesive which features high elasticity, possibly by accepting less strength and hardness may be provided for the second bond.

A further aspect of the present invention is that the strong adhesive, which ensures the mechanical strength of the joint, may be reliably protected from outside influences, a medium to be measured in particular, by the adhesive of the second bond. The latter is advantageously optimized with regard to its resistance vis-à-vis external (e.g., aggressive) media.

Therefore, the present invention renders it possible to utilize the advantageous properties of two different adhesives, thereby achieving an overall optimized joint between two materials having very different temperature coefficients and thus different expansion behaviors.

For a constructive and, from the manufacturing point of view, advantageous embodiment of the joint according to the present invention, the first, in particular metallic, component has a pass-through aperture in which the second, in particular ceramic, component is fixed by the first bond.

The first, in particular metallic, component may preferably be designed as a receptacle sleeve including a centric pass-through aperture and, together with the sleeve casing surface and a layered second bond, forms an exterior contact side to the surrounding, e.g., to a medium to be measured. In this connection, the second bond preferably has a contact side, provided for contact with the external medium, and an inner side, facing away from the contact side but facing and shielding the first bond.

An embodiment of the present invention in which at least one area of the inner side of the second bond is in direct contact with the first bond is constructively preferred.

Preferred use of a joint according to the present invention is possible in a sensor assembly of a measuring device which is insertable into a medium to be tested.

BRIEF DESCRIPTION OF THE DRAWINGS

The present invention is subsequently explained in greater detail as an example based on a drawing.

FIG. 1 schematically shows a joint according to one embodiment of the present invention, FIG. 2 shows a view of a measuring device in which the joint according to one Embodiment of the present invention is used, FIG. 3 shows a sensor assembly of the device as shown in FIG. 2, and FIG. 4 shows a longitudinal section of part of the device as shown in FIG. 2.

DETAILED DESCRIPTION OF VARIOUS EMBODIMENTS OF THE INVENTION

FIG. 1 schematically shows a joint according to one embodiment of the present invention between a metallic component 1 and a ceramic component 2. The metallic component has a sleeve-shaped design including a pass-through bore 3 and an intermediate plate 5 running transversally therein. A bore 8 for passage of ceramic component 2 is provided in intermediate plate 5. The area of bore 8 is filled with a top quality adhesive 10 which firmly embeds a section 12 of ceramic component 2. Adhesive 10 is a particularly strong adhesive which exhibits high adhesivity to metal as well as ceramic materials and, by forming a first bond 14, ensures secure fixing of the ceramic component in bore 8.

Adhesives 10, suitable for these purposes, must have the following properties: They must be very good electrical insulators with as favorable as possible dielectric properties in the entire temperature range. In addition, the adhesives must be able to be used in the temperature range from room temperature to approximately 200 degrees C. Exemplary adhesives are, for example, EP21AOHT, EP21CHT-1, EP21TDCHT-1, EP34CA, EP35, EP39MHT, EP42HT, EP121CL (Master-Bond Corporation); 7030, 903HP, 989, Durapot 801, Resbond S5H13, Duralco 4460, Duralco 4525, Duralco 4525 EHV, Duralco 4535 (Cotronics Corporation); EP 5430 (Rhenatech Corporation); DER 354 (Dow Corning Corporation).

The area of bore 8 filled with adhesive 10 and exterior cover side 15 of intermediate plate 5 is covered with a layer of a second adhesive 16. First bond 14 is thus shielded and protected from the exterior surroundings. These exterior surroundings may be formed by a medium 20 to be tested, to be measured, or to be monitored.

Adhesive 16 of second bond 22 formed in this way has substantially greater elasticity compared to adhesive 10 of first bond 14 and is therefore able to substantially better compensate mechanical and/or temperature-induced stresses. In particular mechanical tensions due to the different temperature expansion behaviors of the different component materials may be better absorbed or compensated by adhesive 16.

Adhesives 16 suitable for these purposes are, for example, RTV 102, 103, 106, 108, 109, 112, 116, 118, 159, 19.01, IS 800, 802, 803, 806, 808, SCS 1001-1003, 1009, 1097, 1297 (General Electric Corporation); Loctite Superflex (Loctite Corporation); VT 3601 E, VU 4691, VU 4694 E, VU 4670 (Peters Corporation); Scrintec 901 (Roth Corporation); 5366, 5367, 5368, 5375, 5398, 5399 (Loctite Corporation).

Exterior side 23 of second bond 22 forms the sole adhesive contact surface 24 to medium 20 and, due to its elastic properties, compensates thermal-related tensions so well that great tightness of the entire joint is ensured. First bond 14, situated behind second bond 22 viewed in the direction of the temperature gradient, is advantageously at a distance from contact surface 24 and thus from the direct temperature effect. Cracking caused by brittle, hard adhesives is thus not an issue. In addition, adhesive 16 may be optimally adjusted to the aggressive properties of medium 20, for example, and may thus fulfill its protective function vis-à-vis the first bond particularly well.

A reliable, lastingly tight, and, from the manufacturing point of view, simple and inexpensive joint between a ceramic and a metallic component is created due to the described combination of two separately optimizable bonds.

As an example, FIG. 2 shows a measuring device including a device assembly 30 and a sensor assembly 31 in which the joint according to one embodiment of the present invention is used. Sensor assembly 31 includes a feeler board and actual sensor 32 which is enclosed by a protective guard 34. The sensor includes a ceramic (feeler) element which requires a liquid-tight and thermostable lead-through from upper sensor assembly tube 36.

Sensor assembly 31 shown in FIG. 3 in an exploded view before installation includes actual sensor 40 which is glued into a bore of a sleeve 42 (sensor receptacle) using a hard adhesive, thereby forming the first bond (see FIG. 1). The sensor (e.g., together with an NTC (negative temperature coefficient) resistor for temperature measurement) is subsequently glued into the sensor receptacle (as described in principle in connection with FIG. 1) using a second adhesive of great elasticity, thereby forming the second bond. The assembly prepared so far is joined with or soldered to a feeler board 43 which carries electrical circuit elements. This system is finally inserted into a protective tube 44 and sensor receptacle 42 is welded to this tube 44.

FIG. 4 shows a highly magnified partial longitudinal section of part of the device, completed in this way. Use of joint 50 according to one embodiment of the present invention in the measuring device is well visible. As described, the joint is made up of a first bond 52 between ceramic component (sensor) 40 and a metallic component (sleeve) 42 and a second bond 54 which covers first bond 52, thereby protecting it from outside influences and the effects of rapid temperature Changes ("temperature shocks"). In addition, indicated NTC resistor 56 and weld 58 between Protective tube 44 and sleeve (sensor receptacle) 42 are recognizable in FIG. 4.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A thermostable and liquid-tight joint between a first component made of metal, ceramic, or plastic and a second component made of metal, ceramic, or plastic which is exposable to the temperature effect of an external medium, including:

a first bond between the second component and the first component and including a first adhesive; and a second bond including a second adhesive, wherein said second adhesive has a greater elasticity than the first adhesive of the first bond, and which is placed in such a way that direct contact of the first bond with the external medium is prevented.

2. The joint as recited in claim 1, wherein the first component has a pass-through aperture in which the second component is fixed by the first bond.

3. The joint as recited in claim 1, wherein the first component is a receptacle sleeve having a centric pass-through aperture.

4. The joint as recited in claim 1, wherein the second bond has an exterior contact side, provided for contact with the external medium, and an inner side, facing away from the contact side but facing and shielding the first bond.

5. The joint as recited in claim 4, wherein at least one area of the inner side of the second bond is in direct contact with the first bond.

6. The joint as recited in claim 1, wherein the first component is made of metal and the second component is made of ceramic.

7. A sensor assembly of a measuring device which is insertable into an medium to be tested, comprising:
   a first component,
   a second component joined to said first component, wherein said second component is exposed to said medium;
   a first bond between the second component and the first component and including a first material; and
   a second bond between the second component and the first component and including a second material, wherein said second material has a greater elasticity than the first material, and wherein said second bond prevents contact of said first bond with said medium.

8. The device as recited in claim 7, wherein the first component has a pass-through aperture in which the second component is fixed by the first bond.

9. The device as recited in claim 7, wherein the first component is a receptacle sleeve having a centric pass-through aperture.

10. The device as recited in claim 7, wherein the second bond has an exterior contact side and an inner side, facing away from the contact side but facing and shielding the first bond.

11. The device as recited in claim 10, wherein at least one area of the inner side of the second bond is in direct contact with the first bond.

12. The device as recited in claim 7, wherein the first component is made of one of ceramic, metal, plastic and any combination thereof and wherein the second component is made of one of ceramic, metal, plastic and any combination thereof.

13. The device as recited in claim 12, wherein the first component is made of metal, and wherein the second component is made of ceramic.

14. A method of joining components, comprising:
   disposing a first component with respect to a second component;
   disposing a first bond between said first component and said second component, said first bond including a first material;
   disposing a second bond between the first component and the second component, said second bond including a second material, wherein said second material has a greater elasticity than the first material, and wherein said second bond prevents contact of said first bond with an external medium.

15. The method as recited in claim 14, wherein the first component has a pass-through aperture in which the second component is fixed by the first bond.

16. The method as recited in claim 14, wherein the first component is a receptacle sleeve having a centric pass-through aperture.

17. The method as recited in claim 14, wherein the second bond has an exterior contact side and an inner side, facing away from the contact side but facing and shielding the first bond.

18. The method as recited in claim 17, wherein at least one area of the inner side of the second bond is in direct contact with the first bond.

19. The method as recited in claim 14, wherein the first component is made of one of ceramic, metal, plastic and any combination thereof and wherein the second component is made of one of ceramic, metal, plastic and any combination thereof.

20. The method as recited in claim 19, wherein the first component is made of metal, and wherein the second component is made of ceramic.

* * * * *